May 20, 1969 P. LECOMTE 3,445,333

PROCESS FOR THE PRODUCTION OF ENERGY BY CONTROLLED FUSION

Filed Dec. 1, 1966

INVENTOR.
PAUL LECOMTE
BY
Woodhams, Blanchard & Flynn
ATTORNEYS

United States Patent Office 3,445,333
Patented May 20, 1969

3,445,333
PROCESS FOR THE PRODUCTION OF ENERGY BY CONTROLLED FUSION
Paul Lecomte, 35 Rue de Soupirs, Epinal, Vosges, France
Continuation-in-part of application Ser. No. 437,869, Mar. 8, 1965. This application Dec. 1, 1966, Ser. No. 598,367
Claims priority, application France, Mar. 10, 1964, 1,388,309
Int. Cl. G21b 1/02
U.S. Cl. 176—1                                6 Claims

ABSTRACT OF THE DISCLOSURE

A process for the production of energy by controlled fusion in which a plurality of pairs of separate proton streams are focused and are directed toward a common point in a magnetic bottle, the streams of each pair being opposed to each other and the protons in the streams of each pair moving in helical paths whose circumferential components of movement extend in opposite circumferential directions in order to increase the probabilities of collisions of the atomic nuclei.

---

This application is a continuation-in-part of my application Ser. No. 437,869, filed Mar. 8, 1965, now abandoned.

The present invention relates to a process for the production of energy by the controlled fusion of light atomic nuclei and is more especially concerned with the production of energy from proton streams, wherein the energy which is sought can be extracted in the form of electric power and/or in the form of thermal energy.

The process in accordance with the invention consists more especially in increasing the probabilities of effective collisions of the protons in such a manner as to increase the energy efficiency of the fusion process.

The process in accordance with this invention mainly consists in contacting at least two identical streams of protons which have the same particle density as well as the same temperature and the same field strength, and which travel in opposite directions relatively to each other.

In particular, the invention mainly consists in endowing these protons with the same energies in such manner that the velocities of gyratory motion of the protons of both of the proton streams in contact are identical and of opposite direction.

In accordance with a preferred mode of application of this process, the proton streams employed are hot, thus permitting the possibility of attaining very high temperatures.

In accordance with an advantageous mode of execution of this process, an even number of identical proton streams are caused to converge toward a same point, the directions of longitudinal motion of two consecutive proton streams being thus angular, for example, at right angles to each other, and each particle thus encounters particles which are travelling in the opposite direction.

The probability of producing head-on collisions can further be increased in the process according to the invention by concentrating coherent wave beams near the center O of the magnetic bottle. For example, the beams obtained by means of the devices known by the name of lasers may be used. In particular, lasers supply photons at high velocities and very high temperature.

In the practical application of this process, it will be possible to bring to the center O of the magnetic bottle which is thus constituted proton streams which are endowed with a continuous motion or pulsatory motion; the advantage of pulsatory motion lies in the fact that the proton streams have particularly high-energy peaks.

By virtue of this convergence and the combination of longitudinal and cyclotronic velocities, the probabilities of collisions and particularly head-on collisions are considerably increased. It is therefore apparent that said head-on collisions are both numerous and effective, and since the particles introduced already have a high energy, there is consequently a maximum probability of head-on approach of said particles with resulting interpenetration or fusion.

As will be apparent, the center O which has been referred to is magnetically isolated.

The products resulting from the fusion process which takes place within the magnetic bottle about the point O are withdrawn by pumping in a manner which is known in the art. Said pumping operation results on the one hand in a difference in gas pressure which increases the velocity of the proton streams and, on the other hand, in the discharge of reaction products such as helium and unfused particles, these products being at an extremely high temperature and electrically charged.

A fact which is already known to those versed in the art and which need not therefore be dwelt upon is that the presence of suitably arranged magnetic fields produces the motion of the proton streams to be utilized and also channels said streams.

Further characteristic features of the invention will be brought out by the description which follows below, reference being made to the accompanying drawings which are given by way of example without implied limitation, and in which.

Figure 1:
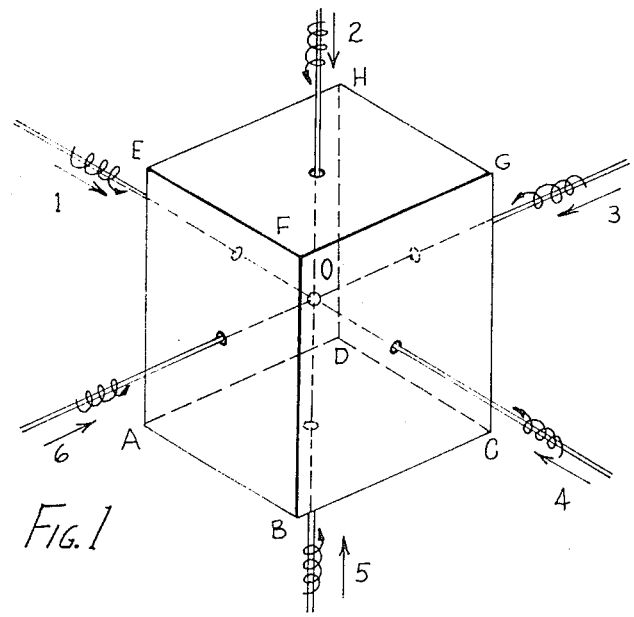
FIGURE 1 illustrates diagrammatically the process according to the invention.

As shown in FIGURE 1, the proton streams which are represented by the vectors 1, 2, 3, 4, 5 and 6 are each perpendicular to one of the faces of an ideal cube ABCDEFGH. These streams therefore converge toward the center O of said cube which constitutes a kind of magnetic bottle which is magnetically isolated. These proton streams each have identical velocities, temperatures, field strengths and proton densities and thus, they have identical energy levels. It is in this central zone O that the collisions take place and these latter have the maximum probability of occurrence owing to the fact that the proton streams are caused to move in pairs both in opposite longitudinal directions to each other as well as in opposite gyratory motions, as has been clearly indicated in the case of the streams 1–4, 3–6, 2–5.

The straight arrows indicate the directions of longitudinal motion of the proton streams while the corresponding curved arrows which surround the respective vectors show the direction of helical motion of the protons in the proton streams.

The pumping of the reaction products is carried out by connecting suitable pumping mechanisms at the apices ABCDEFGH of said magnetic bottle and these pumping procedures are performed with the aid of devices which are well known to those who are skilled in the art.

The protons in each of the streams are caused to travel one after another helically in a single path of constant radius, sometimes hereinafter referred to as a helical flux tube. The dimensions and intensities of the electromagnetic fields acting on the proton streams are selected so that the diameters of the helical flux tubes should be equal to the diameters of the helical paths followed by the protons in said fields.

Figure 2:
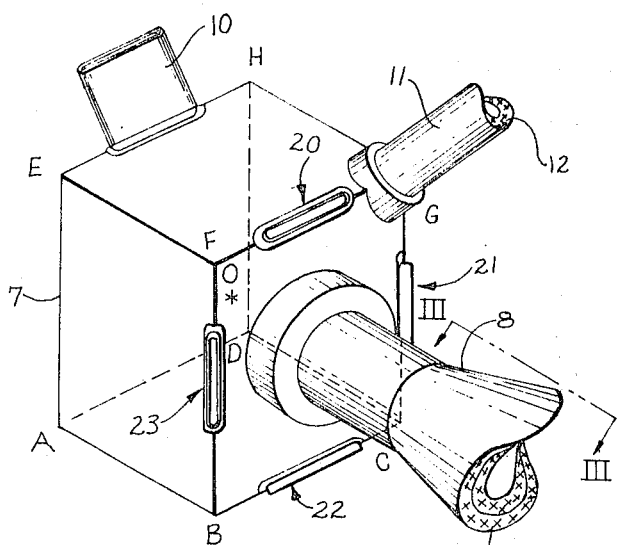
FIGURE 2 is a diagrammatic view of a device for the practical application of said process.

FIGURE 2 indicates diagrammatically one embodiment of the invention in which the enclosure 7 in which the proton streams are contacted is of hollow cubical shape. The introduction of one of the streams of protons is effected at 8, said protons being isolated from their envelope by means of a magnetic field generated by coils or windings 9. Identical proton introduction means are provided on the other faces of the cube but same have not been shown for the sake of clarity of the figure.

Figure 3:
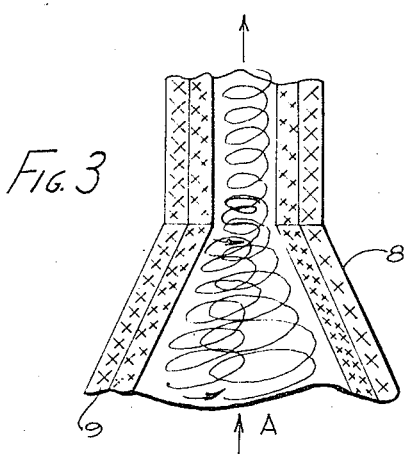
FIGURE 3 illustrates diagrammatically the method of focusing a stream of protons.

The method of focusing the protons of each stream in a single helical flux tube by means of an electromagnetic field is shown in FIGURE 3.

The proton stream is obtained from an accelerator of any suitable type and the proton stream is injected into the converging inlet 8 in the direction indicated by the arrow A. The protons move through helical paths as indicated by the solid lines in FIGURE 3. The inlet 8 has the electromagnetic means 9 associated therewith for applying an electromagnetic field to the protons so that the protons move through the helical paths as shown. Thus, a proton which is introduced into an electromagnetic field, such as shown in FIGURE 3, which field has a value of 100,000 gauss would have a helical path radius of $6.5 \times 10^{-1}$ cm., that is, a diameter of 13 mm. The electromagnets, therefore, form a magnetic bottle which provides a cylindrical cavity 13 mm. in diameter. Since the protons can travel only within this cylindrical cavity, a flux tube having a radial thickness equal to the diameter of one proton or $10^{-12}$ cm. is formed. This being so, all of the protons must travel through the tube one behind another and it is impossible for the protons to travel abreast. A maximum focusing of the particles is thus achieved. When one flux tube is directed at another flux tube having identical characteristics, there is a maximum probability of particle collision. This is true whether the involved flux tubes have directly opposite paths or only convergent axes.

The energy of the proton stream comprises the sum of the following:

(1) The particle flux, as is well known, has a thermal energy at the time of ejection from the accelerator which is equal to $$\Sigma_{n_1} \cdot K \cdot T$$

wherein $n_1$ = number of ions
K = Boltzmann constant
T = absolute temperature (2) The particle flux also has kinetic energy resulting from the velocity V imparted by the accelerator, (3) The kinetic energy is increased by the electromagnetic fields which create the helical path previously referred to. These electromagnetic fields produce a longitudinal velocity, such that:

$$V_1 = \frac{-C^2 \overrightarrow{\text{grad }} \varphi + \frac{\epsilon}{C}\overrightarrow{A}}{\frac{d\varphi}{dt}\epsilon V}$$

wherein

C = speed of light
$\varphi$ = the phase
$\epsilon$ = the basic charge
$\overrightarrow{A}$ = vector potential of field
V = scalar potential of field This depends on the vector potential of the field $$\overrightarrow{A}$$

and on the scalar potential of the field V both of which can be controlled at will. The particle gyration velocity is dependent on the longitudinal velocity V, and (4) The kinetic energy is still further increased by the difference in gas pressure between the point of injection of particles into the accelerators and the ejection of the products, fused or not, from the magnetic bottle 7.

Assuming by way of example that the machine operates with an energy of $10^{10}$ electron volts produced by a proton accelerator and with an electromagnetic field of 100,000 gauss along each of the axes 1 to 6, then there will accordingly be obtained in the case of the protons of each helical flux tube an energy which, by virtue of the total of the energies indicated hereinabove, will be substantially higher than $10^{10}$ electron volts and each flux tube has a radial thickness of $10^{-12}$ cm. Under these conditions, the energies of the potential barriers between two adjacent protons become infinitesimally small in comparison with the energies imparted to the protons. The probability that the protons will combine or fuse together is high. If the machine were to operate with proton accelerators producing energies in excess of $10^{10}$ electron volts and with an electromagnetic field of over 100,000 gauss, the results of fusion processes would be achieved with an even higher degree of probability.

The focusing, guidance, velocities, kinetic and thermal energies of the particles are increased by injecting coherent waves, such as of the laser type, in the form of sheaths which surround the streams of particles to be fused.

At the central zone of each edge of the cubical enclosure 7, such as at zone 10 between corners E and H, coherent wave beams, such as of the laser type, are injected and are directed toward the center O. The coherent wave beams thus travel at angles of 45 degrees to the lengthwise axes of the proton streams. These coherent wave beams form sheaths around the proton streams. There may be twelve such coherent wave beams. Each proton stream, such as the stream formed in proton inlet 8, is thus surrounded by four coherent wave beams, such as the beams injected at the zones 20, 21, 22 and 23, which produce the following-described effects.

Since the velocity of a photon in a coherent wave beam is equal to the velocity of light, said velocity is higher than the longitudinal and gyrational velocities of the protons as said protons move toward the point O. This results in an increase in energy of the protons.

Coherent waves have been produced having an energy in the vicinity of $10^{11}$ W./cm.$^2$, wherein W = watts per cm.$^2$ thereby producing hypersonic waves in the frequency range $10^8$ to $10^9$ cycles per second. These hypersonic waves produce further compressions in the proton fluxes which are already of high density. This will result in an increase both in temperature and energy of the proton streams.

As has been shown by recent experiments, electrons are produced at the time of impact of a coherent wave on a proton flux and there is accordingly produced, to whatever extent may be necessary, the de-ionization of the protons which have not fused. A recovery of thermal energy accordingly results.

Inasmuch as the temperature in the coherent wave prior to impact on the protons is within the range $10^6$ to $10^{10}$ degrees K., and in spite of the very small mass of a photon, there is a small but by no means negligible introduction of energy which takes place precisely in the fusion zone.

The reference numeral 11 in FIGURE 2 designates the envelope of the passage through which the reaction products are discharged while the reference numeral 12 designates means for generating a magnetic field to isolate these products from the envelope 11. Said envelope is placed at the apex G of the enclosure 7. It will be apparent that other similar outlets can also be provided at one or a number of other apices of the enclosure 7.

A cubic configuration has been chosen by way of example solely in order that a better understanding of the method in accordance with the invention may thus be gained. However, it will be clear that this method is not limited to this configuration and could equally well be carried into effect by means of any other suitable configuration.

Advantage can consequently be gained from the fact that, in the first place, the resulting streams of products are at a very high temperature and energy can therefore be recovered in the form of heat and, in the second place, said streams carry electrical charges in motion which permit withdrawal of electric power.

In particular, the streams which are discharged from the magnetic bottle can be directed into heat exchangers constituting a recovery system which is known per se and electric power can be withdrawn either directly or by making use of the well-known principle of field current displacement.

Although a particular preferred embodiment of the invention has been disclosed above in detail for illustrative purposes, it will be recognized that variations or modifications of such disclosure, which come within the scope of the appended claims, are fully contemplated.

The embodiments of the invention in which an exclusive property or privilege is claimed are defined as follows:

1. A process for the production of energy by the controlled fusion of light atomic nuclei using proton streams, which comprises:
   generating protons and accelerating same by proton accelerator means in order to form a plurality of separate proton streams;
   injecting each of said proton streams into a converging inlet and cylindrical cavity and generating a magnetic field within said converging inlet and cylindrical cavity by means of coils associated therewith so that said protons of said stream move in helical paths along said converging inlet and are focused by said magnetic field in said converging inlet and cylindrical cavity to define a single cylindrical proton flux tube, the radial thickness of said flux tube being equal to the diameter of the protons, the flux tubes for all of the proton streams being of the same radius and radial thickness;
   directing the flux tubes into a magnetically isolated magnetic bottle with the flux tubes being arranged in a plurality of pairs, the flux tubes of each pair lying in a common plane and being opposed to each other and at least one of the pairs of flux tubes being located in a different plane from the other pairs of flux tubes, the flux tubes having the same proton density and field strength and the protons in the flux tubes of each pair moving in helical paths whose circumferential components of movement extend in oppositely circumferential directions, the axes of all of the pairs of flux tubes being arranged to converge toward a common point in said bottle whereby to increase the probability of collisions of the protons in the proton flux tubes and thereby increase the energy efficiency of the fusion process;
   withdrawing from the magnetic bottle the products resulting from the contacting of the flux tubes with each other; and
   recovering useful energy from said products.

2. A process according to claim 1, in which the flux tubes of each pair are coaxial and the axes for the respective pairs of flux tubes are perpendicular to each other.

3. A process according to claim 1, in which the protons are moved with a pulsating motion.

4. A process according to claim 1, including the step of directing at least one coherent wave beam toward said common point in order to increase the probability of collisions of the protons.

5. A process as defined in claim 1, including the step of directing a plurality of coherent wave beams toward said common point, the coherent wave beams being arranged so that each proton flux tube is surrounded by coherent wave beams as it approaches the common point.

6. A process as defined in claim 5, in which the coherent wave beams are arranged on four sides of each proton flux tube and said wave beams are directed at angles of about 45° with respect to their associated proton flux tube.

References Cited

UNITED STATES PATENTS

| | | | |
|---|---|---|---|
| 3,094,474 | 6/1963 | Gale | 176—1 |
| 3,155,592 | 11/1964 | Hansen et al. | 176—1 |

FOREIGN PATENTS 938,987  10/1963  Great Britain.

OTHER REFERENCES

Masers and Lasers, a New Market With Enormous Growth Potential, E. G. Rechsteiner and R. L. Saxe, pub. by Technology Markets, Inc., New York, N.Y. p. 57.

REUBEN EPSTEIN, *Primary Examiner.*